3,503,307
DIAPHRAGMS
Kazimierz Migdal, London, England, assignor to I.V. Pressure Controllers Limited, Feltham, England, a British company
Filed Mar. 28, 1968, Ser. No. 716,952
Claims priority, application Great Britain, Mar. 31, 1967, 14,997/67
Int. Cl. F01b *19/00;* F16j *3/00*
U.S. Cl. 92—98                                    4 Claims

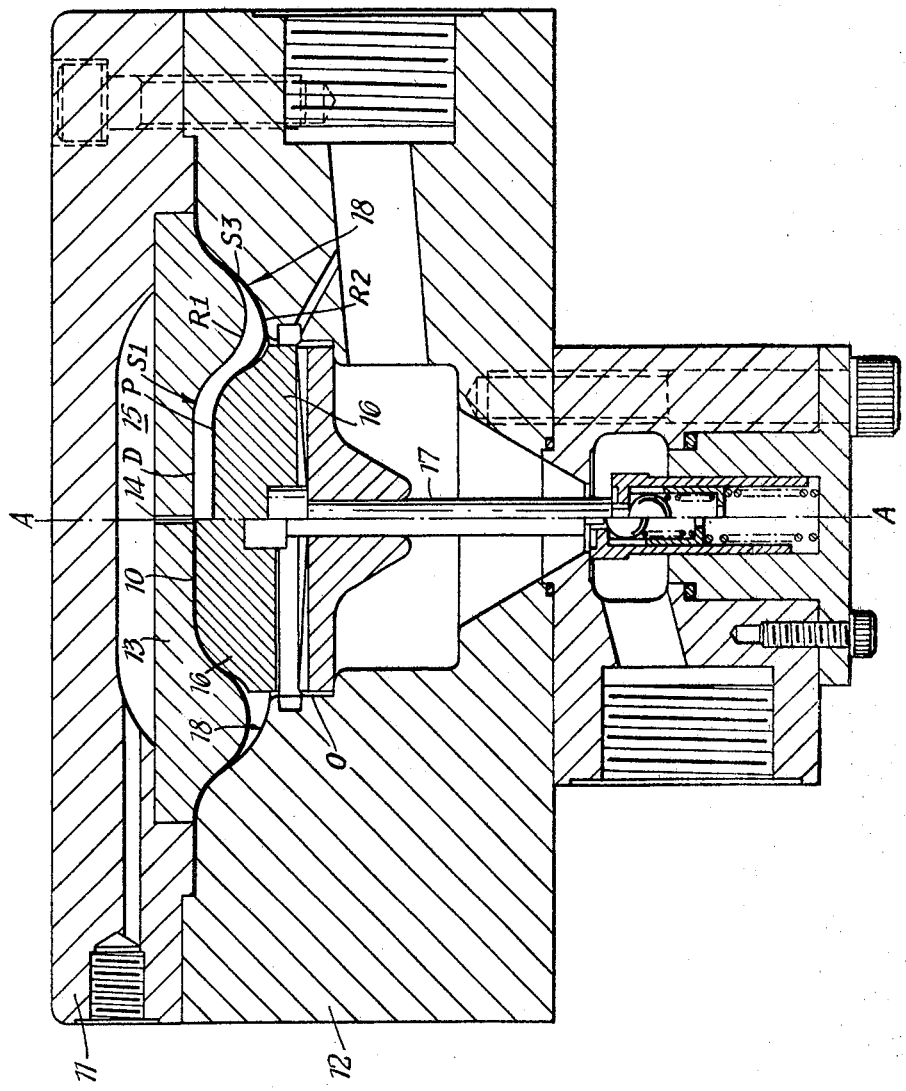

ABSTRACT OF THE DISCLOSURE

In a diaphragm operated pressure reducing valve or the like a rolling diaphragm is employed which is formed of a non-elastomeric material and is supported both during and at the limits of its travel so that the diaphragm will never be subjected to full differential pressure without support.

---

This invention relates to diaphragms such as are employed for actuating pressure reducing valves and the like.

It has been common practice in diaphragm operated valves to employ diaphragms formed of elastomeric materials such as rubber but experience has shown that in certain cases the use of such materials is not entirely satisfactory. For example elastomers are unsuitable in those cases where the valve is employed to control what may be termed aggressive mediums, for example, highly toxic or corrosive liquids or fluids, or mediums at extreme temperatures.

It is the chief object of the invention to provide a diaphragm assembly which will allow the use of materials which do not normally lend themselves to being used as diaphragms, in circumstances of high stroke to diameter ratio and under high pressures.

Broadly in accordance with the invention it is proposed to employ a rolling diaphragm formed of a non-elastomeric material and to support such diaphragm during and at the limits of its travel.

For a better understanding of the invention reference will now be made to the accompanying drawings which illustrates one possible constructional embodiment by way of example.

In the drawing the diaphragm assembly is shown as applied to a pressure reducing valve of the gas or fluid loaded type but for the present purposes the constructions of the valve itself is of no real importance and may be disregarded. In the drawings 10 denotes a diaphragm which is clamped in position around its periphery between two casing or housing parts 11, 12 such diaphragm comprising a preformed disc of a non-elastomeric material. The material from which the diaphragm is made and the thickness thereof may vary depending upon the requirements in and particular case and it may be formed of metal or metal alloy such as beryllium copper or stainless steel or of a suitable plastics material such as P.T.F.E. Disposed above the diaphragm and also clamped between the parts 11, 12 is a plate 13 the underside of which is profiled as shown, such plate having an aperture 14 providing communication with a pressure loading chamber 15. Disposed below the diaphragm is an appropriately profiled disc 16 with which the valve actuating rod or plunger 17 is associated. In addition to the profiled surfaces of the plate 13 and disc 16 it will be noted that the casing part 12 is provided with an appropriately profiled surface 18, the arrangement being such that the diaphragm will be fully supported both during movement and at the limits of its travel which are respectively illustrated at the left and right hand sides of the center line A—A.

With respect to the profiled surfaces noted hereinabove, it will be appreciated that the first part of the apparatus consisting of part 11 and plate 13 effectively possesses an undulating surface S1 with a recess D provided with a ring R1 of a first diameter, this ring protruding from the recess.

The second part which is part 12 has a recessed surface S3 within which is provided an opening O in which the piston 16 is displaceable.

The piston or disc 16 has an upper surface P which engages the diaphragm and which also conforms generally to the surface S1 of the plate 13 within the ring R1 such that the diaphragm can be urged against the aforesaid undulated surface S1 with respect to one extreme position of the piston 16.

In the other extreme position of the piston, the surface P thereof cooperates with the surface S3 to form a second undulating surface having a recessed ring R2 corresponding generally in shape to the ring R1 but being of a lesser diameter than the same at the high points of the respective rings as viewed from the same direction.

Because of the particular configurations of the surfaces described above, movement of the piston 13 between its two extremed positions can roll the diaphragm between two flexed positions in the manner indicated hereinbelow.

With the construction above described and illustrated loading of the diaphragm will result in bending or flexing being spread over the whole length and there will be no local flexing but a smooth and continuous rolling action. As a result of the choice of supporting profiles with constant linear surface the diaphragm is never subjected to full differential pressure without support and thus thin diaphragm can be used with consequent advantages in improved sensitivity. Moreover a diaphragm such as is illustrated will be capable of resisting high pressures and at the same time of producing large movements in relation to its diameter.

I claim:
1. Apparatus comprising first and second separable parts cooperatively defining a chamber, a relatively thin diaphragm supported by at least one of said parts and located in said chamber, said diaphragm being a non-elastomeric material, said first part having a surface of undulated form with a recess provided within a ring of first diameter, said second part having a recessed surface facing the first said surface and having an opening in the recessed surface, and a displaceable piston in said opening and adapted to engage with said diaphragm, said piston having a surface which engages said diaphragm and conforms generally to the said surface of said first part within the ring whereby the diaphragm can be urged against said undulated surface and which further is adapted to form, cooperatively with the recessed surface of the second part, an undulating surface having a recessed ring corresponding generally in shape to the first said ring but of lesser diameter whereby movement of said piston can roll the diaphragm between two flexed positions with diaphragm peeling from one ring to the other.

2. Apparatus as claimed in claim 1 wherein said first part includes a body and a plate set in said body, and said first and second parts are provided with ducts leading to said chamber.

3. Apparatus as claimed in claim 2 wherein the diaphragm is of a metallic material.

4. Apparatus as claimed in claim 2 wherein the diaphragm is of a plastic material.

References Cited

UNITED STATES PATENTS

| | | | |
|---|---|---|---|
| 1,466,243 | 8/1923 | Neal | 92—103 XR |
| 2,241,056 | 5/1941 | Chilton | 92—101 XR |
| 2,496,215 | 1/1950 | Jones | 92—101 XR |
| 2,591,852 | 4/1952 | Murray | 219—38 |
| 2,667,786 | 2/1954 | Spaulding | 73—398 |
| 2,689,586 | 9/1954 | Anderson | 92—103 XR |
| 2,748,797 | 6/1956 | Heizer et al. | 92—98 XR |
| 2,839,086 | 6/1958 | Engelberger | 92—103 XR |
| 2,916,255 | 12/1959 | Koehler | 92—103 XR |
| 2,918,089 | 12/1959 | McFarland | 92—103 XR |
| 2,961,165 | 11/1960 | Whiteneck | 92—103 XR |
| 3,086,550 | 4/1963 | Cummings | 92—103 XR |
| 3,093,086 | 6/1963 | Altoz et al. | 92—103 XR |
| 3,104,617 | 9/1963 | Barr | 92—103 XR |
| 3,354,831 | 11/1967 | Acker et al. | 92—98 XR |
| 3,400,908 | 9/1968 | Bauer | 92—104 XR |
| 3,416,461 | 12/1968 | McFarland | 92—98 XR |

MARTIN P. SCHWADRON, Primary Examiner

LESLIE J. PAYNE, Assistant Examiner

U.S. Cl. X.R.

92—101, 103